United States Patent
Borntraeger et al.

(10) Patent No.: US 9,309,934 B2
(45) Date of Patent: Apr. 12, 2016

(54) SHIFTING ELEMENT WITH THREE SHIFT POSITIONS

(71) Applicant: ZF Friedrichshafen AG, Friedrichshafen (DE)

(72) Inventors: Kai Borntraeger, Langenargen (DE); Markus Mueller, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 532 days.

(21) Appl. No.: 13/848,188

(22) Filed: Mar. 21, 2013

(65) Prior Publication Data

US 2013/0256087 A1    Oct. 3, 2013

(30) Foreign Application Priority Data

Mar. 27, 2012 (DE) .................. 10 2012 204 839

(51) Int. Cl.
*F16H 21/04*   (2006.01)
*F16D 48/02*   (2006.01)
*F16D 21/04*   (2006.01)
*F16D 25/061*  (2006.01)
(Continued)

(52) U.S. Cl.
CPC .............. *F16D 25/14* (2013.01); *F16D 21/04* (2013.01); *F16D 25/061* (2013.01); *F16D 48/02* (2013.01); *F16H 61/30* (2013.01); *F16H 63/3023* (2013.01); *F16D 2500/1026* (2013.01); *F16D 2500/10493* (2013.01); *F16D 2500/70217* (2013.01); *F16D 2500/70406* (2013.01); *F16H 2061/307* (2013.01)

(58) Field of Classification Search
CPC ....... F16D 25/14; F16D 25/061; F16D 21/04; F16D 48/02; F16H 61/30; F16H 63/3023; Y10T 74/20; Y10T 74/20018; Y10T 74/2003
See application file for complete search history.

(56) References Cited

U.S. PATENT DOCUMENTS 3,945,265 A * 3/1976 Bell .................. F16H 61/30
                                               192/3.58
4,998,443 A * 3/1991 Janiszewski ........ F16H 61/2807
                                               74/335

(Continued)

FOREIGN PATENT DOCUMENTS

DE    40 38 170 A1    6/1992
DE   197 56 639 A1    6/1999

(Continued)

OTHER PUBLICATIONS

German Search Report Corresponding to DE 10 2012 204 839.1.

*Primary Examiner* — David M Fenstermacher
(74) *Attorney, Agent, or Firm* — Davis & Bujold, P.L.L.C.; Michael J. Bujold

(57) ABSTRACT

A method of actuating a shifting element with three shift positions, having a simply controlled shifting cylinder as the actuating element, a shifting element for shifting to the three shift positions and a pressure regulator, such that the shifting cylinder is designed as a cylinder with one working line and the shifting element is pushed by the spring force of at least one spring element to an end position and moved to the other shift positions in opposition to the spring force. The central position is recognized in that, when the correct shifting element position is reached, the force for moving the shifting element in opposition to the spring force abruptly increases and, because of this, a specific pressure can be set by a pressure regulator for the central position.

9 Claims, 4 Drawing Sheets

(51) Int. Cl.
  *F16H 63/30* (2006.01)
  *F16H 61/30* (2006.01)

(56) References Cited

U.S. PATENT DOCUMENTS

| | | | |
|---|---|---|---|
| 5,417,124 A * | 5/1995 | Huff | F16H 61/0003 74/335 |
| 5,566,070 A * | 10/1996 | Mack | F16H 59/70 477/111 |
| 6,612,196 B1 | 9/2003 | Petzold | |
| 6,889,811 B2 * | 5/2005 | Ebert | F16D 25/14 192/48.618 |
| 7,430,936 B2 * | 10/2008 | Petzold | F16H 61/28 192/109 F |
| 7,950,323 B2 * | 5/2011 | Kauffeldt | F16H 63/3023 92/140 |
| 8,752,443 B2 * | 6/2014 | Bai | F16H 61/30 477/154 |

FOREIGN PATENT DOCUMENTS

| | | |
|---|---|---|
| DE | 103 42 389 A1 | 4/2005 |
| DE | 10 2004 053 205 A1 | 6/2005 |
| DE | 10 2009 043 572 A1 | 4/2011 |
| WO | 2011/105952 A1 | 9/2011 |

* cited by examiner

SHIFTING ELEMENT WITH THREE SHIFT POSITIONS

This application claims priority from German patent application serial no. 10 2012 204 839.1 filed Mar. 27, 2012.

FIELD OF THE INVENTION

The invention concerns a method for actuating a shifting element with three shift positions and a device according to the invention.

BACKGROUND OF THE INVENTION

Shifting elements for torque transmission, for example in the form of shifting clutches or claws, have long been known in geared mechanical transmissions such as countershaft transmissions. Countershaft transmissions are usually made with gearwheels, so-termed loose wheels, mounted rotatably, on a shaft, which mesh with gearwheels connected in a rotationally fixed manner to other shafts so that they form so-termed gear pairs. By alternately connecting the gearwheels mounted rotatably on the shaft to the shaft in a rotationally fixed manner, the gear pairs can be connected into the force flow of a countershaft transmission by means of appropriate shifting elements such as synchronizers, claws or frictional elements in order to obtain various gear steps. As a rule this requires an actuating element in the form of a manual actuator, an electric actuator or a piston/shifting-cylinder arrangement that can be actuated hydraulically or pneumatically. In such piston/shifting-cylinder arrangements a piston is arranged and able to move axially in a shifting cylinder. The piston can move actively to at least one shift position and in its thrust direction is directly or indirectly connected fixed to the shifting element. In this case the actuating element can actuate the shifting elements mechanically, hydraulically, pneumatically or magnetically in relation to the shaft on which the rotatably mounted gearwheels are arranged.

A shifting element usually belongs to a shifting group of a geared mechanical transmission. In such a case a shifting group is preferably formed of two rotatably mounted gearwheels arranged next to one another in the transmission, which can alternately be engaged in the torque transmission by means of a shifting element. As is known, for example from the document DE 197 56 639 A1 by the present applicant, in such cases for each shifting group of a geared transmission, one shifting element with a cylinder that acts on both sides, having a piston which is moved by a fluid, can be used.

Depending on the design, it can also be necessary to maintain a central position in a shifting group, this as a rule being the neutral position. In the central or neutral position it is important that no part of the shifting element engages with any loose wheel. Thus, for example the central position constitutes the passive position of the actuating element. In that case the actuating element is held in the central position for example by springs, and has to be pushed actively to the other two shifts positions. For this, in pneumatic or hydraulic control systems two working lines and two piston faces are needed. Without such holding in the central position by spring action there is a risk that the central position will not be able to be approached, set and maintained exactly so that parts of a shifting element are at least partially engaged with a loose wheel.

The problem of a safe approach to the central position can also be solved by mechanical systems without the central position being held by springs. One solution is described, for example, in the document DE 40 38 170 A1. A shifting cylinder is considered, which has a two-sided controllable piston coupled to a shifting element, the piston being acted upon with a pressure medium by way of control elements such as displacement valves. The piston consists of two double pistons that act in opposition, which can move within a common cylinder housing, such that in the cylinder housing a respective pressure space with a pressure medium connection is associated with each of the two double pistons. The first piston of each double piston is rigidly connected to move with a shifting element and the second piston of each double piston is connected to a first piston so that it can move freely. When the pressure is equalized on both sides, the two double pistons are held in the neutral position with their freely movable, second pistons against a stop in the cylinder housing, and in each case when acted upon alternatively by pressure on one side or the other, they are pushed out of the neutral position to the shifting position, in such manner that the unpressurized double piston with its two pistons has its shifting displacement imparted to it by the pressurized double piston.

However, for example due to lack of fitting space or even by virtue of a component identity approach or platform concept, it can be in part not possible, or only so with difficulty, to realize a shifting cylinder that can be actuated to both sides with two working lines and with a corresponding control system.

SUMMARY OF THE INVENTION

Accordingly, with a hydraulically or pneumatically controlled actuating element in the form of a shifting cylinder with one working line, the purpose of the invention is to ensure reliable movement to three shift positions of a shifting element for the shifting of a shifting packet. In this, the central position in particular should be secure so that in this position there can be no contact between parts of the loose wheels and the shifting element.

The basic concept of the invention is that to move a piston in a cylinder against a force, a certain fluid pressure is needed as the displacing force. If, from a particular point along the control path, the opposing force increases abruptly from one shift position to the next, that point in the control path can be recognized and maintained by not increasing the fluid pressure and hence the displacing force any further. To move the piston farther, the fluid pressure in the pressure space of the cylinder has to be increased until a displacing force is built up which is larger than the opposing force acting on the piston.

The invention solves the problem in that a shifting element is pushed by a spring element to a first end position. To bring about a shift, the shifting element must be actuated hydraulically or pneumatically to move it along the control path against the force of the spring element. To recognize the central, or neutral position precisely, when the central position is reached the lever arm is made shorter by virtue of a special contour on the area contacted by the spring element. The area contacted by the spring element is understood to be the elements that are in contact with the spring element, such as pressure elements for transmitting the force to the spring element, buttress elements or supports that hold the spring element. This produces an abrupt increase of the displacement force required in order to move the shifting element farther and reach the third shift position at the second end position of the piston. In a fluid-actuated system this abrupt force increase enables a specific pressure to be set. For this, cup springs or membrane springs of various designs are used as spring elements. The cup spring can be designed such that it exerts a spring force that remains almost constant over the control path. To move farther along the control path no pressure increase of the actuating element is needed, since the spring element presses the shifting element back with its spring force.

An abrupt increase of the displacement force as required by the invention can also be produced by a combination of at least two spring elements. In this case a first spring element exerts a first force on the shifting element in opposition to its movement direction and, beyond a particular position along the control path, this first opposing force is supplemented by a second opposing force produced by a second spring element. This also produces an abrupt increase of the displacement force required. In this variant according to the invention torsion springs are used as the spring elements. Of course, the different spring forces can also be produced by a plurality of spring elements.

BRIEF DESCRIPTION OF THE DRAWINGS

The invention and its embodiment variants will now be described in greater detail with reference to the following drawings, which show.

DETAILED DESCRIPTION OF THE PREFERRED EMBODIMENTS

Figure 1:
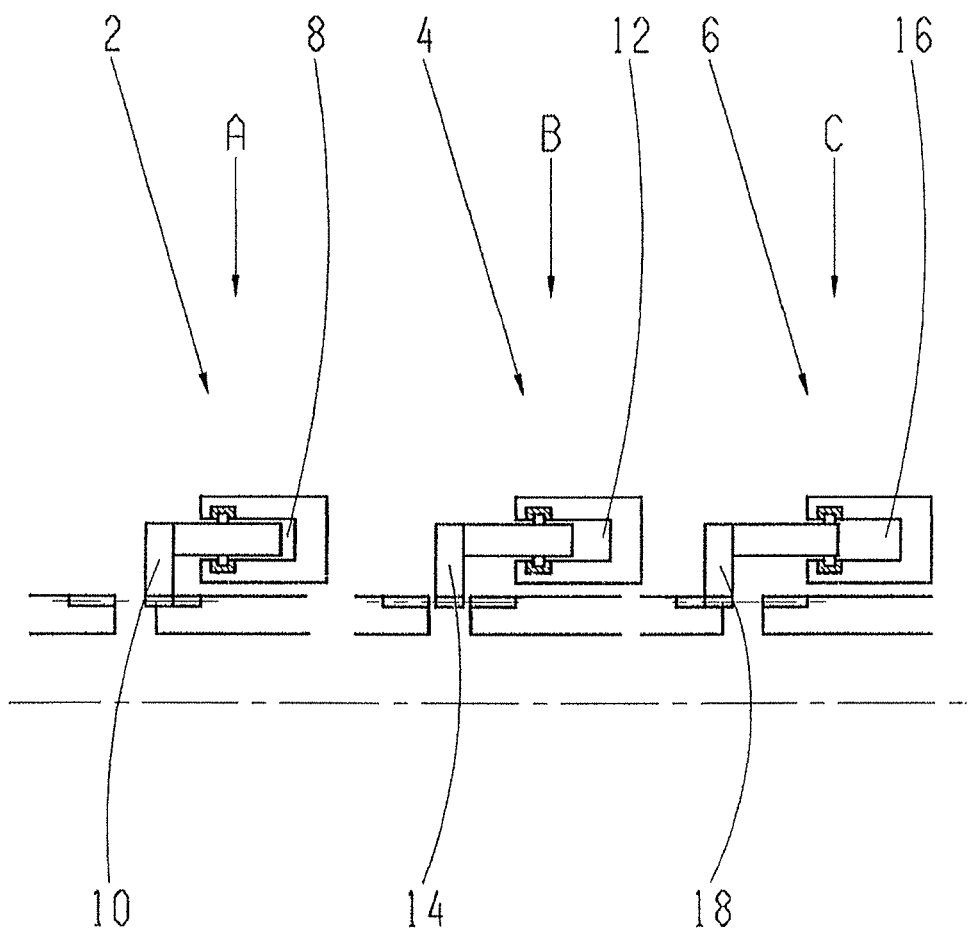
FIG. 1: Diagram of the hydraulic actuation of a claw (as in the prior art)

In FIG. 1 (showing the prior art) the three shift positions A, B, C will be explained briefly. The figure shows three shifting groups 2, 4, 6 each with an actuating element 8, 12, 16 respectively, in the form of a controlled cylinders with a piston, and a shifting element 10, 14, 18 respectively which is connected directly to the piston. Each of the shifting groups 2, 4, 6 is pictured in one of the three shift positions A, B, C. The first shifting group 2 is in the shift position A in which the piston of the actuating element 8 is in its first end position. In that shifting position the shifting element 10 is engaged with the gearwheel closest to the actuating element 8. The second shifting group 4 is shown in the second shifting position B, namely the central or neutral position. The piston of the actuating element 12 of the shifting group 4 is in the central position and the shifting element 14 is then not engaged with either of the gearwheels of the shifting group 4. The third shifting group 6 is shown with the piston of the actuating element 16 and thus also the shifting element 18 in the third shifting position C. In this third shifting position C, the shifting element 18 is engaged with the gearwheel of the shifting group 6 which is farthest away from the actuating element 16, and the piston has reached its second end position.

Figures 2, 2A:
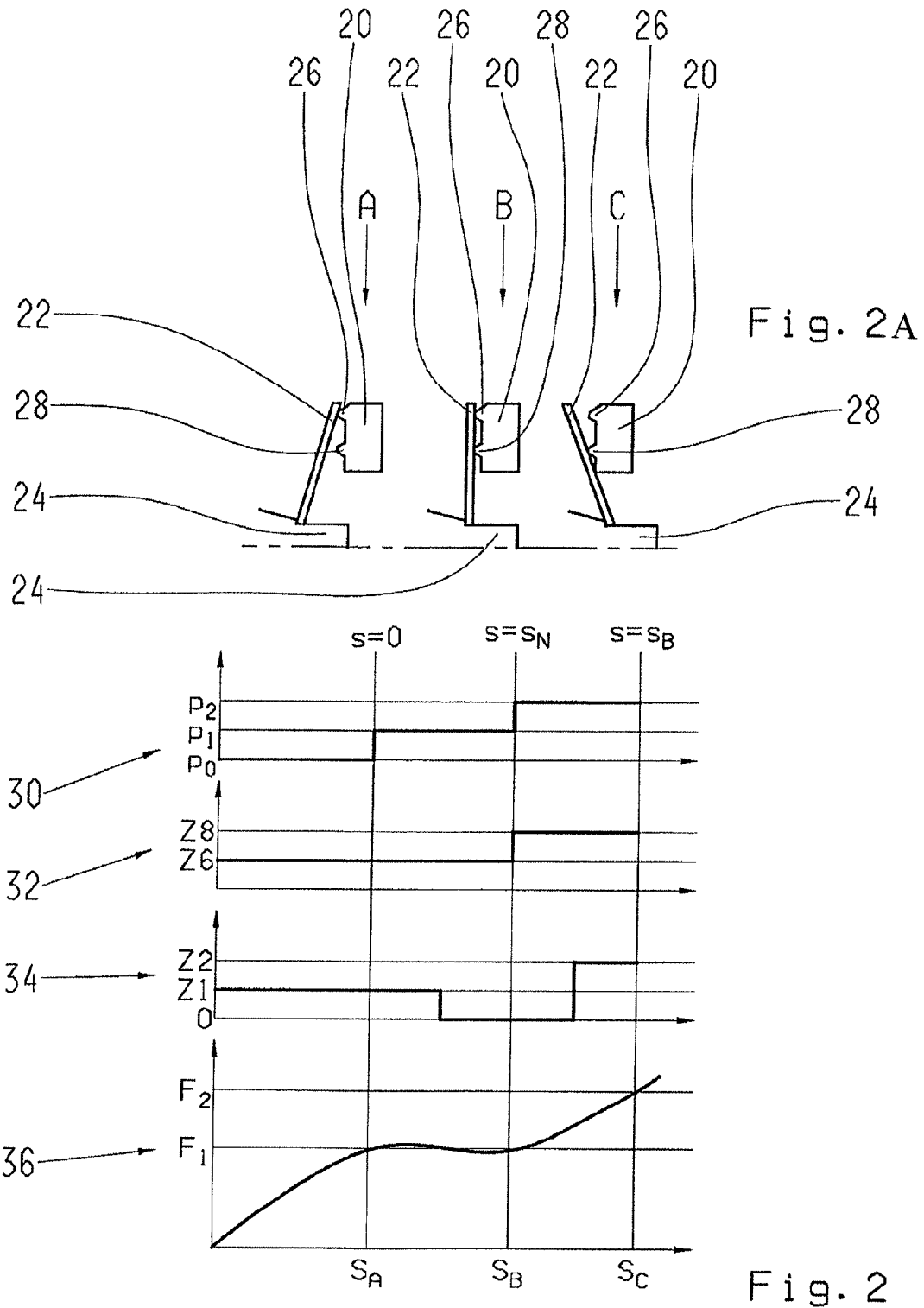
FIGS. 2 and 2A: Diagram of a lever arm shortened according to the invention, and associated characteristic curves

FIGS. 2 and 2A show the diagram of a lever shortened according to the invention and the associated characteristic curves in the shift positions A, B, C already described. FIG. 2A shows a device according to the invention with a pressure element 20, which is connected to an actuating element (not shown here) and which is in contact with a cup spring 22 on one side. The pressure element 20 is part of a shifting element. Radially on the inside and on its side facing away from the pressure element 20 the cup spring 22 is in contrast with a mounting support 24. The pressure element 20 serves to transmit the actuating pressure, starting from the actuating element, by way of the pressure element 20, to the cup spring 22, whereas the cup spring 22 with its spring force is already prestressed in shift position A and presses against the pressure element 20. The pressure element 20 does not rest against the cup spring over a flat area, but is provided with a special contour. In this example according to the invention this takes the form of two contours elements 26, 28 shaped as pointed elevations on the side of the pressure element 20 that faces toward the cup spring 22. The contour element 26 is radially farther away from the axis of the cup spring 22 than is the contour element 28. In the first shift position A the pressure element 20 contacts the cup spring 22 only at the contour element 26. In order to reach the central position, i.e. shift position B, the actuating element has to move the pressure element 20 and the cup spring 22 against the force of the cup spring 22. During this the pressure transmission takes place via the contour element 26 until the second shift position B is reached and the cup spring 22 adopts a position in which both contour elements 26 and 28 are in contact with the cup spring 22. From then on, with further actuation of the shifting element toward the third shift position C, the pressure transmission is taken over by the contour element 28. The distance of the contour element 28 away from the point where the cup spring 22 is in contact with the mounting support 24 is smaller than that of the contour element 26. Thus, the lever for transmitting the force of the actuating element is shorter, and a larger force must therefore be applied in order to move the pressure element 20 farther in the direction toward shift position C. As a result different pressures are needed in order to move to shift position C, starting from shift position A, so that for each shift position A, B, C specific actuating pressures can be defined. Hence the actuating pressure can be adjusted in such manner that all the shift positions A, B, C can reliably be achieved.

The performance graphs 30 show the actuating element pressures at each shift position A, B, C, at the respectively associated points $S_A$, $S_B$, $S_C$ along the control path. At the first shift position A a certain actuating pressure $p_1$ is required in order for the contour element 26 to move the cup spring 22 in the direction toward shift position B. At shift position B there is an abrupt increase of the actuating pressure and a pressure $p_2$ is needed to move the cup spring farther to the third shift position C. In the initial shift position A no pressure has to be applied, since there the actuating element is in its end position.

The performance graphs 32 show the functions of the contour elements 26, 28 along the control path $S_A$, $S_B$, $S_C$. As far as shift position B the pressure is transmitted by way of the contour element 26. From the time, in the second shift position B, when both contour elements 26, 28 are in contact, during any further movement in the direction toward the third shift position C, the force is transmitted by the contour element 28.

The performance graphs 34 show the overlap or engagement of the shifting element with the gearwheels of the shifting group along the control path $S_A$, $S_B$, $S_C$. In the first shift position A the shifting element is engaged with the claws of a first gearwheel Z1 of the shifting group. In the third shift position C the shifting element is engaged with the claws of a second gearwheel Z2 of the shifting group. In the second shift position B, the neutral position, according to the stated objective no part of the shifting element must be in contact with a gearwheel Z1, Z2. The diagram shows that before reaching the second shift position B the connection of the shifting element with the first gearwheel Z1 is broken, and only on the way from the second shift position B to the third shift position C does the shifting element engage with the second gearwheel Z2.

The performance graph 36 shows the variation of the spring force over the control path $S_A$, $S_B$, $S_C$. As already described, a cup spring 22 can be used so that the actuating force remains almost constant over a control distance. In this example the cup spring 22 has been prestressed until it exerts approximately the force $F_1$. This corresponds to the prestressing force with which the piston of the actuating element is loaded in its initial position A. To move it from the first shift position A to the second shift position B, an actuating pressure must be applied which is greater than the spring force $F_1$. From the second shift position B onward the spring force curve rises. To move from the second shift position B to the third shift position C, namely to the second end position of the piston of the actuating element, it is thus necessary for the actuating element to apply a force at least larger than $F_2$. The force increase of the cup spring 22 from the second shift position B onward, indicated by the spring characteristic curve, can additionally support the abrupt pressure increase for the recognition of the central position.

Figure 3:
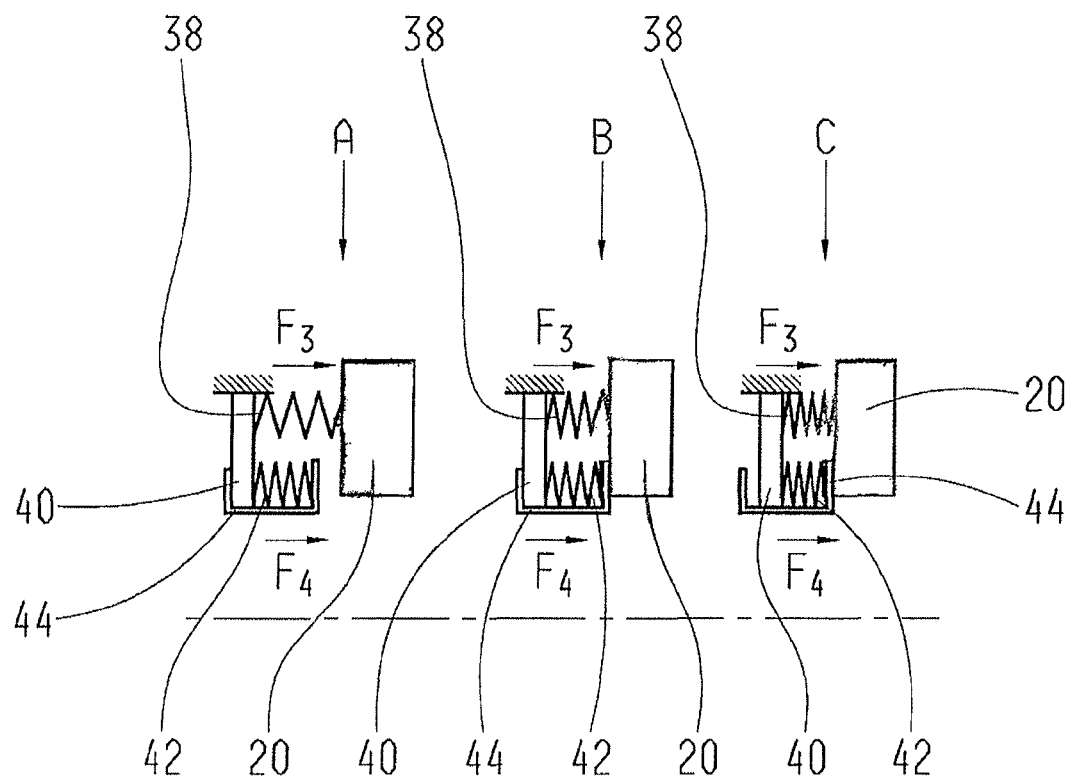
FIG. 3: Diagram of the actuation of a pressure element with a combination of two springs

As already described, the abrupt pressure increase can be produced not only by means of a defined contour on the contact area of a cup spring, but also by actuating a pressure element in combination with spiral springs. This is illustrated in FIG. 3. In this case the pressure element 20 is not provided with a special contour, but is connected to one end of a first spiral spring 38. At its opposite end in the direction of the shifting path S, the spring is attached to a spatially fixed buttress element 40. In the initial position the first spiral spring 38 is already acted upon with pressure by the pressure element 20. The pressure element 20 is part of the shifting element and is connected to an actuating element (not shown). On the buttress element 40, a second spiral spring 42 is attached to the same surface to which the first spiral spring 38 is attached. The second spiral spring 42 is inserted under compression between the buttress element 40 and a first inner side of a U-shaped holding element 44. The second inner side of the U-shaped holding element 44 is in contact with the side of the buttress element 40 facing away from the pressure element 20. The first spiral spring 38 acts upon the pressure element 20 with a force $F_3$ in the direction of the control path. The control path is the distance to be covered by the actuating element or by the pressure element 20 in order to move from the first shift position A to the second shift position B and then to the third shift position C. In FIG. 3 the shifting element is shown in all three shift positions. In the initial shift position A, the spring force $F_3$ of the first spiral spring 38 pushes against the pressure element 20. To move to the second shift position B, the spring force $F_3$ of the first spiral spring 38 must therefore be overcome. When the pressure element 20 reaches the outside of the U-shaped holding element 44, shift position B has been reached. At this point an abrupt pressure increase is produced since, to move farther to the third shift position C, in addition to the spring force $F_3$ of the first spiral spring 38, the spring force $F_4$ of the second spiral spring 42 is also now being applied. In this case the U-shaped holding element 44 serves to ensure exact positioning of the second shift position B and of the abrupt pressure increase produced by virtue of the second spiral spring 42. To be able to move to the third shift position C, from the second shift position B onward both of the spring forces $F_3$, and $F_4$ have to be overcome. If now the pressure element moves farther to the third shift position C, not only are the two spiral springs 38, 42 compressed but also the U-shaped holding element 44 is pushed in the direction along the control path.

Figure 4:
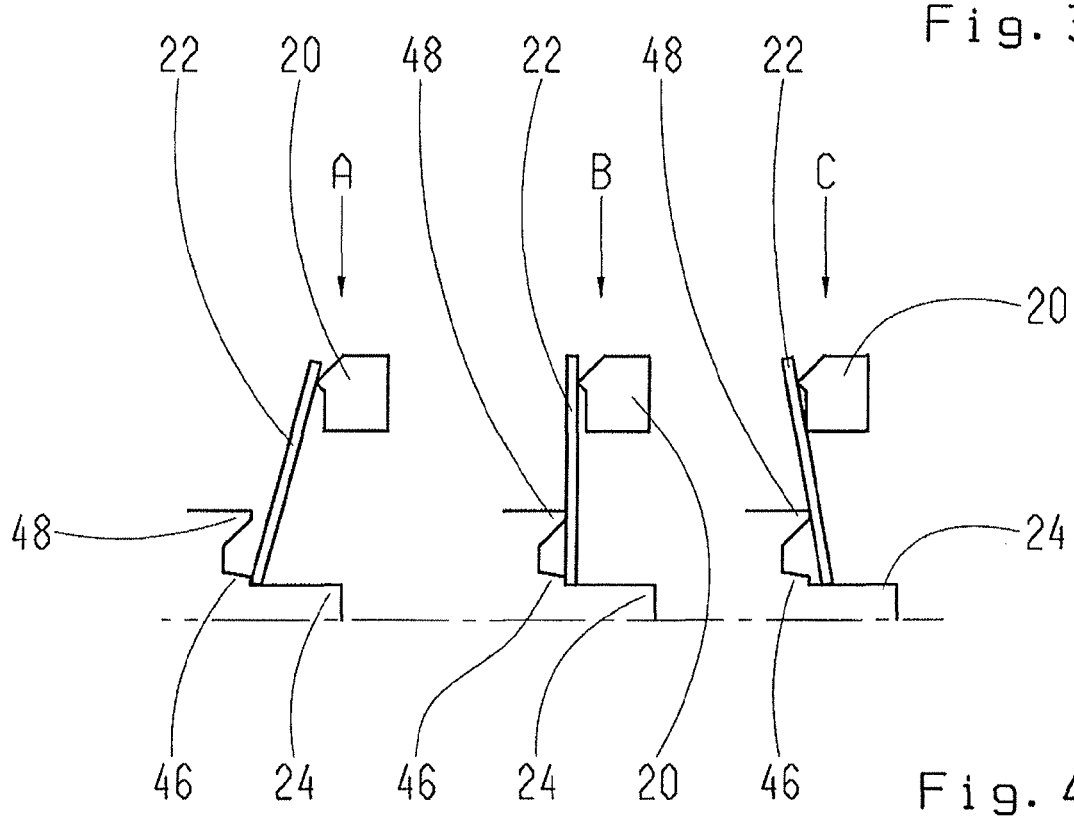
FIG. 4: Method according to the invention, with a contour on the buttress element

FIG. 4 illustrates a method according to the invention in which there is a contour on the buttress element. The contour for changing the effective lever length does not necessarily have to be formed on a pressure element or on the side of the actuating element. The contour can also be formed on a separate buttress element positioned adjacent to the cup spring 22 on the side facing away from the pressure element 20, or as illustrated in this case, it can be provided by the design of the holder 24 itself, in which the contour is formed directly. Again, there are two contour elements 46 and 48. The first contour element 46 is directly at the contact point of the cup spring 22 on the holder 24. Again, the shifting element is shown in all three shift positions A, B, C. In the first shift position A, namely the first end position of the piston of the actuating cylinder, a force is exerted by the pressure element 20 on the cup spring 22 so that the cup spring 22 is prestressed. The cup spring 22 is in contact only with the contour element 46 on the holder 24. If now the actuating element is moved along the control path in the direction toward the third shift position C, then when the second shift position B is reached the second contour element 48 too comes in contact with the cup spring 22. The effective lever of the pressure element 20 on the cup spring 22 is thereby shortened and an abrupt pressure increase takes place. In order to move farther to the third shift position C, a larger force or a higher pressure must be exerted on the pressure element 20 and the cup spring 22. Thus, the second shift position B can be clearly distinguished.

Figure 5:
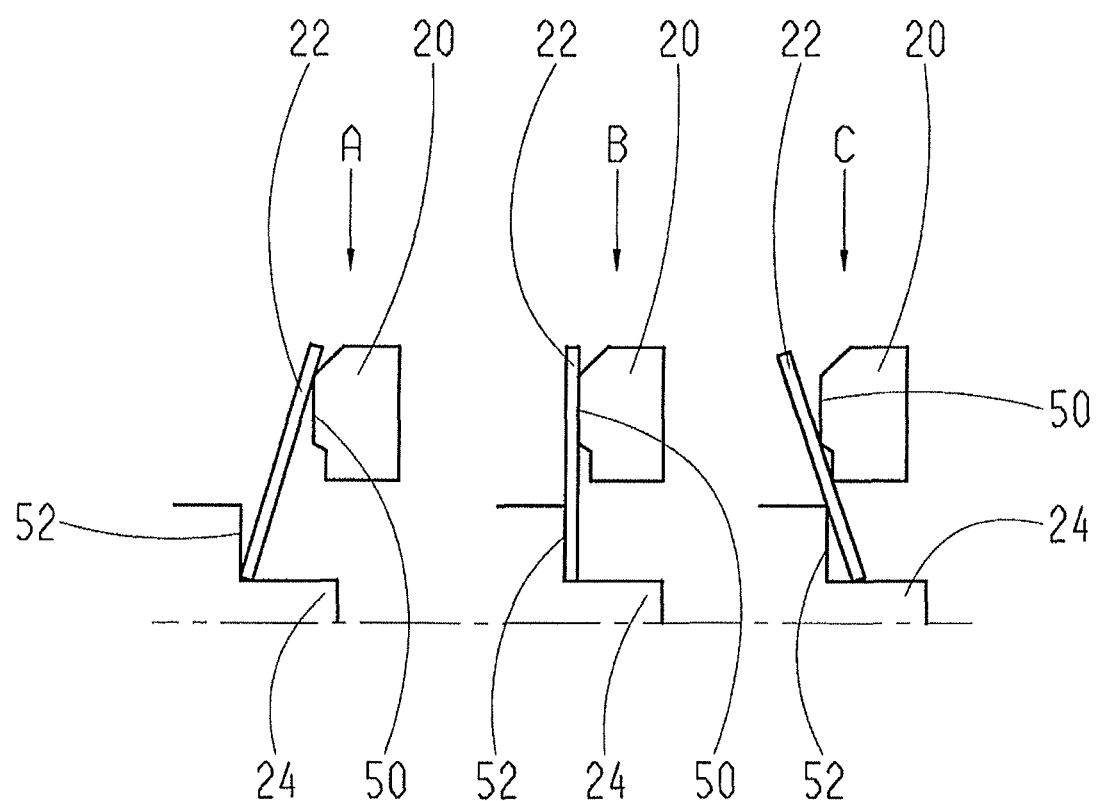
FIG. 5: Method analogous to FIG. 4 with a contour on the pressure element and on the buttress element

A more pronounced pressure increase can also be produced if a corresponding contour can be formed on different elements of the shifting group. In FIG. 5, for example, contours are formed on the pressure element 20 and on the holder 24. FIG. 5 also shows that the contour for lever shortening can be designed differently. In this case there are no sharply projecting individual contour elements, but instead contour surfaces 50 and 52. Other contour designs that have the same effect are possible. To illustrate the shift sequence the shifting element is shown in all three shift positions A, B, C. In the initial position A the pressure element 20, which is part of the shifting element, presses against the pre-stressed cup spring 22. The cup spring 22 rests against the holder 24 radially inside at the corner of the contour surface 52. The pressure element 20 contacts the cup spring 22 only with the radially outer edge of the contour surface 50 located toward the edge of the cup spring 22. If now the pressure element 20 is pushed in the control path direction to the second shift position B, the actuating element must overcome at least the force of the cup spring 22 to be able to move. When the second shift position B is reached the surfaces 50 and 52 are both in contact with the cup spring 22. During subsequent movement from the second shift position B to the third shift position C, according to the invention a lever shortening takes place. On moving in the control path direction the cup spring 22 is in contact with the edge of the surface 50 closest to the holder 24 and with the edge of the surface 52 next to the pressure element 20. The lever length of the cup spring 22 is accordingly shorter and correspondingly a larger force has to be applied in order to shift from the second shift position B to the third shift position C. The abrupt pressure increase required according to the invention is therefore brought about.

In present-day hybrid transmissions, already present proportional pressure regulators can be used to produce the pressure jump. In a proportional pressure regulator a specific pressure corresponds to a specific current. No further regulators have to be built in.

INDEXES

2 Shifting group
4 Shifting group

6 Shifting group
8 Actuating element
10 Shifting element
12 Actuating element
14 Shifting element
16 Actuating element
18 Shifting element
20 Pressure element
22 Cup spring
24 Holder
26 Contour element
28 Contour element
30 Actuating pressure performance graph
32 Contour element performance graph
34 Gearwheel engagement performance graph
36 Spring performance graph
38 First spiral spring
40 Buttress element
42 Second spiral spring
44 U-shaped holder
46 Contour element
48 Contour element
50 Contour surface on the pressure element
52 Contour surface on the holder
A First shift position, first end position
B second shift position, neutral position
C Third shift position, second end position
$S_A$ Position along the control path at shift position A
$S_B$ Position along the control path at shift position B
$S_C$ Position along the control path at shift position C
$p_1, p_2, p_3$ Actuating pressure
Z1 First gearwheel
Z2 Second gearwheel
$F_1, F_2, F_3, F_4$ Spring force

The invention claimed is:

1. A method of actuating a shifting element (10, 14, 18, 20), having three shift positions (A, B, C), with a simply controlled shifting cylinder as an actuating element (8), the shifting element (10, 14, 18, 20) for shifting to the three shift positions (A, B, C) and a pressure regulator, the shifting cylinder being designed as a cylinder with one working line and the shifting element (10, 14, 18, 20) being biased to a first end position (A), by a spring force of at least one spring element (22, 38, 42), and being moved, in opposition to the spring force, to the other shift positions (B, C), the method comprising the steps of:
recognizing a central position (B) in that, when a correct shifting element position is reached, a force for moving the shifting element, in opposition to the spring force, abruptly increases and defines an abrupt force increase and, because of this, a specific pressure is set by a pressure regulator for the central position (B).

2. The method of actuating a shifting element (10, 14, 18, 20) according to claim 1, further comprising the step of producing the abrupt force increase by shortening of a lever.

3. The method for actuating a shifting element (10, 14, 18, 20) according to claim 2, further comprising the step of shortening the lever by providing a contour on a contact area of the spring element (22).

4. The method for actuating a shifting element (10, 14, 18, 20) according to claim 3, further comprising the step shortening the lever by providing a contour on at least one of a pressure element (20) and a holder (24) of the spring element (22).

5. The method for actuating a shifting element (10, 14, 18, 20) according to claim 1, further comprising the step of utilizing cup springs (22) as the spring elements.

6. The method for actuating a shifting element (10, 14, 18, 20) according to claim 1, further comprising the step of bringing about the abrupt force increase by at least two spring elements (38, 42) in a such manner that the spring force of at least one spring element (38) is active from the first position (A), and the spring force of at least one second spring element (42) is only active once the shifting element (10, 14, 18, 20) reaches the central position (B).

7. The method for actuating a shifting element (10, 14, 18, 20) according to claim 6, further comprising the step of utilizing spiral springs (38, 42) as the spring elements.

8. The method for actuating a shifting element (10, 14, 18, 20) according to claim 1, further comprising the step of designing the spring elements (22, 38, 42) such that the spring force exerted by the spring elements is approximately constant over a control path between the first end position (A) and the central position (B).

9. A method of actuating a shifting element (10, 14, 18, 20) between three distinct shift positions (A, B, C), the shifting element being coupled to a shifting cylinder actuator (8), and the method comprising the steps of:
applying an actuating force on the shifting element to bias the shifting element by activating the shifting cylinder actuator via a pressure regulator and a working line;
exerting a spring force on the shifting element to bias the shifting element;
directing the actuating force to bias the shifting element in a first axial direction from a second end position toward a first end position and directing the spring force to bias the shifting element in a second opposite axial direction from the first end position toward the second end position, and a central position being located axially between the first and the second end positions;
defining the central position as a point at which an amount of the actuating force, required for biasing the shifting element in the first axial direction in opposition to the spring force, abruptly increases; and
setting a specific pressure by the pressure regulator for precisely positioning the shifting element in the central position.

* * * * *